Figure 1:
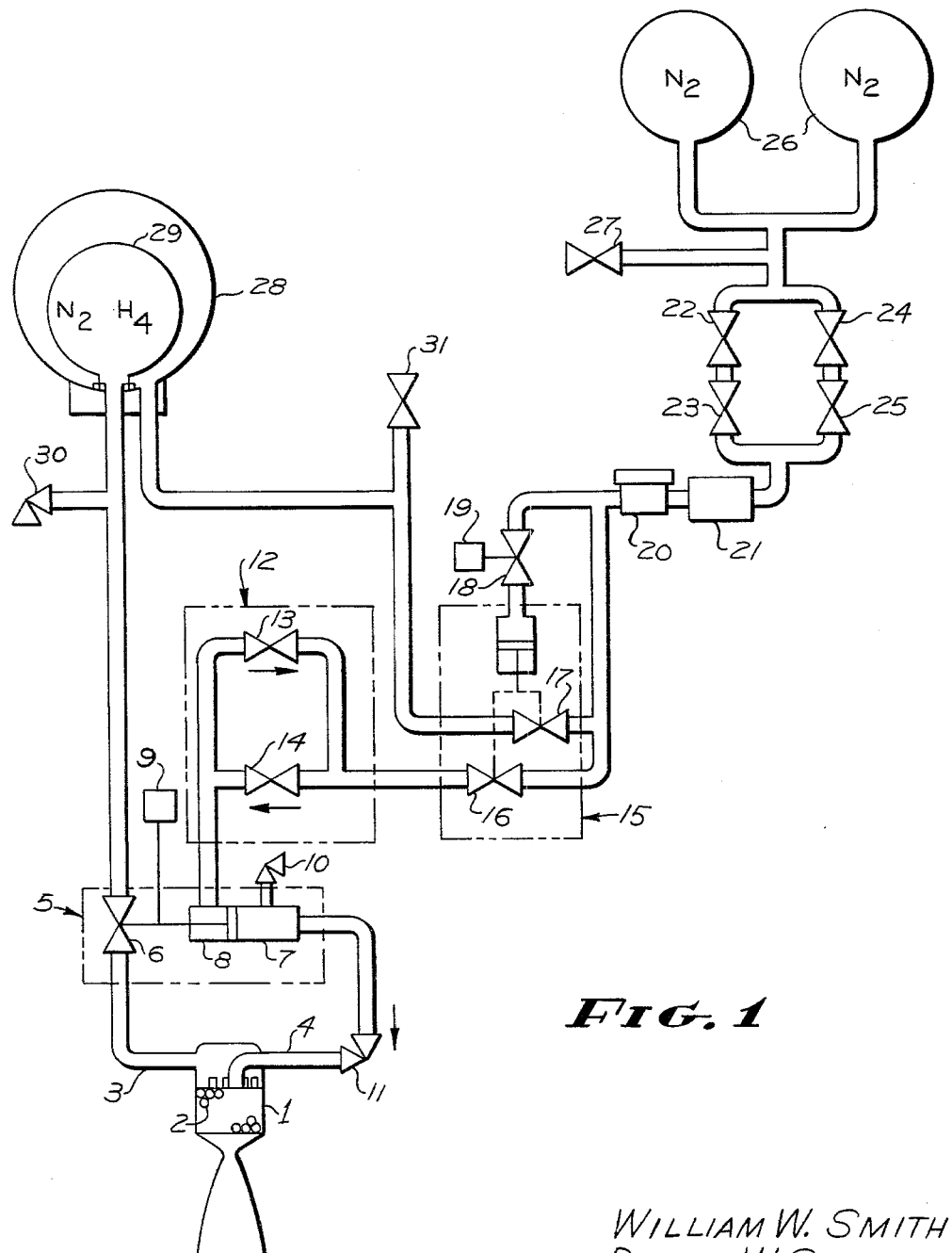

WILLIAM W. SMITH
BRUCE W. SCHMITZ,
INVENTORS

WILLIAM W. SMITH
BRUCE W. SCHMITZ,
INVENTORS

United States Patent Office 3,229,463
Patented Jan. 18, 1966

3,229,463
TRAJECTORY-CORRECTION PROPULSION
SYSTEM
Hugh L. Dryden, Deputy Administrator of the National Aeronautics and Space Administration, with respect to an invention of William W. Smith and Bruce W. Schmitz
Filed June 26, 1963, Ser. No. 290,867
9 Claims. (Cl. 60—39.48)

The present invention relates to a multiple-start propulsion system suitable for use on lunar and planetary spacecraft as a trajectory-correction and maneuver system. More particularly, the present invention relates to a trajectory correction propulsion system which is capable of multiple "space" starts and which employs an ignition start slug device.

Trajectory control systems are, of course, desirable in spacecraft since they permit elimination or reduction of launch errors thereby eliminating the need for the precise launch instrumentation which is presently necessary for most spacecraft flights. In addition, trajectory control systems impart a highly desirable flexibility to spacecraft guidance, thereby permitting post-launch changes in course which may be made desirable by unforeseen or changed circumstances relating to the flight of the spacecraft. Previous attempts to provide trajectory control systems have been primarily directed to means for throttling the propellant supplied to the combustion chamber of the rocket engine and to temperature control of the reaction which occurs in the combustion chamber of the rocket engine. However, these methods require apparatus which is heavy, bulky and severely limited in duration of application. Furthermore, prior art systems which have conventionally required the storage of propellant and oxidizer in close proximity have been subject to spontaneous explosion caused by leakage of these materials into a common chamber. This has proved to be a particular disadvantage in systems including throttle valves or valves which open and close slowly. Still further, many of these systems which have previously been developed have required undesirably complicated control mechanisms.

The present state-of-the art also exhibits marked deficiencies when considered from the standpoint of efficiency and reliability in control applications. The degree of dependability of a propulsion system is generally a function of several factors including the power controls which encompass propellant ignition, regulation during thrust increase to the rated thrust, conditions controlling malfunction probability during starting, some form of thrust control and fuel-oxidizer mixture ratio or propellant utilization control. Thus, previous attempts to effectively correlate these numerous factors have involved highly complicated devices which have been subject to electrical and mechanical malfunction in various elements thereof.

Most methods of achieving attitude control of spacecraft are limited to varying the thrust during the original firing of the rocket engine. There are two relatively convenient ways to vary the thrust magnitude. The first of these is by reducing the pressure of combustion in the rocket chamber. However, this also reduces efficiency and is not a truly attractive method. The second method is adjustment of the throat area of the thrust chamber. Thermodynamically this is a more efficient means than the preceding, but often results in mechanical difficulties. It should be noted that while both of these arrangements are workable, they do impose compromises. Therefore, these attempts toward impulse variation do not enjoy a general acceptance. Furthermore, these methods are not adapted to the requirements of long space flights in which it is often necessary to make one or more trajectory-corrections relatively soon after launching, then permit the spacecraft to approach its target for a relatively long period of time, e.g., several months, and then make one or more trajectory-corrections as the craft approaches its target. The present invention provides a novel and effective solution to these problems.

Thus, it is a primary object of the present invention to provide a trajectory control propulsion system having maximum reliability and reproducibility, minimum requirements for pre-flight handling and spacecraft interactions, minimum requirements for in-flight electrical signals and sequencing and a minimum of system components.

Another object of the present invention is to provide an improved rocket engine characterized by relatively light weight, small size, reusability and suitably for varied sizes and classes of vehicles.

A further object of the present invention is to provide a trajectory control propulsion system having feed means for the propellant and catalyst which assure that ignition will occur only when intended so as to eliminate malfunction hazards.

Still further, another object of the present invention is to provide a trajectory control propulsion system which may be easily and effectively started and stopped during the flight of a spacecraft.

A still further object of the present invention is to provide a trajectory control propulsion system including a ratchet-type propellant valve oxidizer start slug device which allows positive displacement of a predetermined quantity of oxidizer in a zero-G field upon each opening actuation of the propellant valve.

Other objects and advantages of the present invention, it is believed, will be apparent from the following detailed description of specific embodiments when read in connection with the drawings.

Briefly, in a preferred embodiment, the trajectory correction propulsion system of the present invention employs a liquid monopropellant, e.g., anhydrous hydrazine, as the propellant. In this embodiment, the system is functionally a regulated-gas-pressure fed, constant-thrust rocket. This system is provided with a ratchet-propellant valve oxidizer start slug combination which allows positive placement of a fixed quantity of oxidizer, e.g., $N_2O_4$, in a zero-G field, upon each opening actuation of the propellant valve. The injection of this fixed quantity of oxidizer as a result of an engine start command results in a bipropellant hypergolic ignition which is followed by continuous catalytic monopropellant decomposition of the propellant. This system is capable of multiple "space" starts and extended storage, up to four months or more, in a space environment. The system can be fueled, pressurized, and monitored, for several weeks prior to installation in the spacecraft because, even in the pressurized and fueled condition, it is safe for personnel to work near the system even when the temperature varies over wide ranges, e.g., 35° F. to 165° F. There is no need for spacecraft umbilicals or hard lines to maintain the propulsion system of the present invention in the ready condition.

The principal elements of this embodiment of the present invention include a high pressure gas reservoir, a gas pressure regulator, a propellant tank including a propellant bladder and a rocket engine. Jet vanes may be located at the exit plane of the nozzle and may be used to deflect the decomposition exhaust products for roll, yaw and pitch control. Preferably, the rocket engine contains a quantity of catalyst to accelerate the decomposition of the propellant.

The concept of the present invention is predicated on the basis that it satisfy anticipated long-term storage and multiple start requirements of midcourse and approach correction propulsion systems. In order to better fulfill long-term storage requirements, it is preferred to use gaseous nitrogen pressurization rather than gaseous helium. In a like manner, explosive valves are preferably provided so that potential leak sources and problem areas can be isolated during long storage periods, e.g., from pre-flight loading to mid-course firing, from mid-course shut-off to first approach correction, and from last approach correction on. Multiple start capability is preferably realized by the inclusion of a single small solenoid valve which pilot operates a valve controlling the pneumatic circuitry of the system. Exclusive of the solenoid pilot valve and explosive valves, all valves are preferably pneumatically opened with regulated nitrogen pressure and closed by mechanical spring force when opening pressure is vented. Thus, the system provides multiple start capability without any dependence of number of components upon number of starts.

In another embodiment of the present invention, the explosive valves and the valve system operated by the pilot valve may be eliminated. In this embodiment, a solenoid valve, a check valve and a delay assembly are relied upon to control the system.

Figure 2:
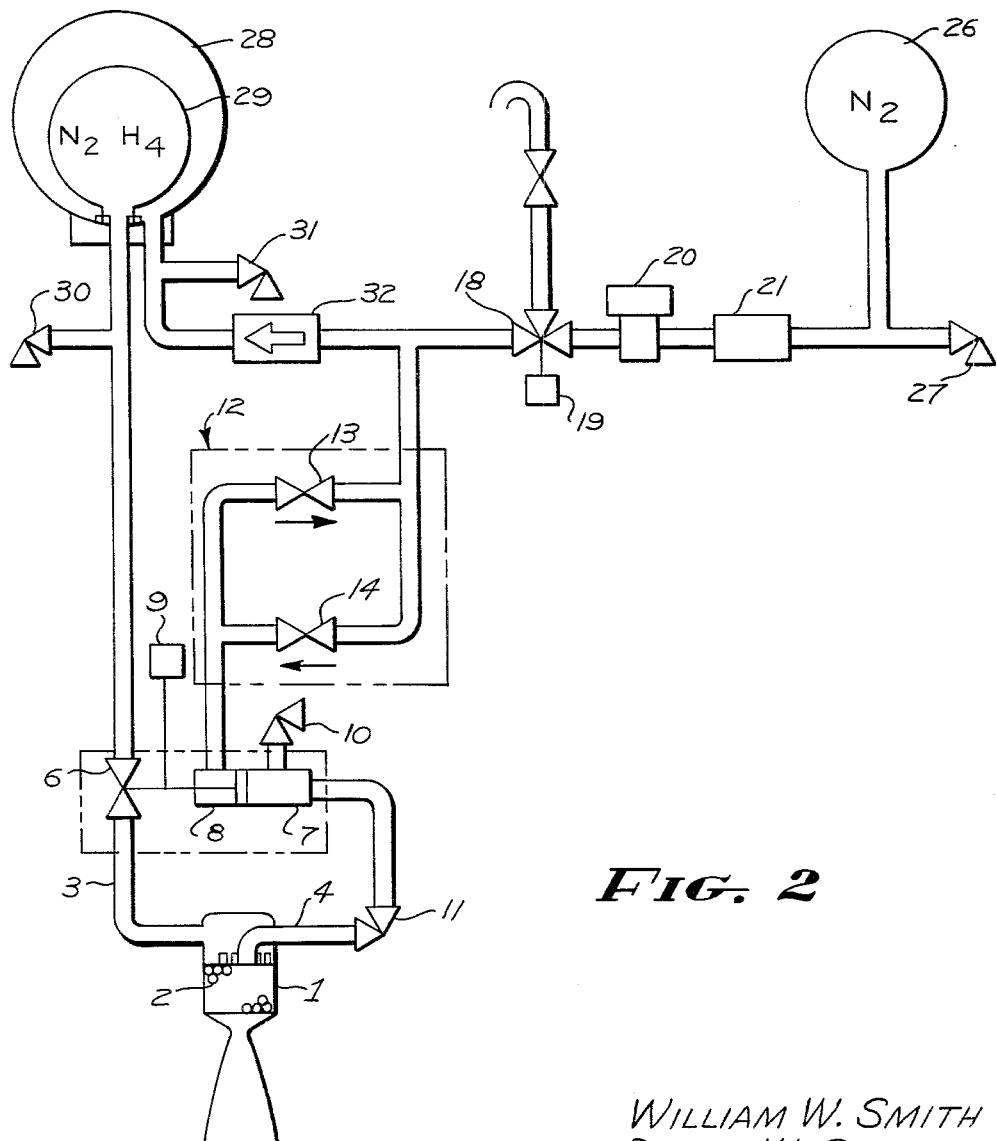

Referring now to the drawings, FIGURE 1 illustrates one embodiment of the system of the present invention while FIGURE 2 illustrates another embodiment of the system of the present invention.

In the embodiment illustrated in FIGURE 1, the system of the present invention is attached to a conventional monopropellant hydrazine rocket engine 1. Preferably, this engine is provided with catalyst pellets 2. Engine 1 receives hydrazine fuel through conduit 3 and oxidizer through conduit 4. Flow through conduits 3 and 4 is controlled by the combination of elements indicated generally by numeral 5. Included in combination 5 are valve 6 and oxidizer storage reservoir 7. Reservoir 7 is provided with a ratchet oxidizer start slug subassembly 8 such as that described and claimed in copending application Serial No. 290,870, filed June 26, 1963, now Patent No. 3,170,605, in the name of William F. MacGlashan, Jr., which application is incorporated by reference herein. Subassembly 8 is connected to valve 6 and is provided with microswitch 9 which functions as a valve position indicator for valve 6. Reservoir 7 is provided with valve 10 which permits filling of the reservoir with the oxidizer and conduit 4 is provided with back pressure valve 11.

A delay valve combination which is indicated generally by numeral 12 is connected to subassembly 8. Delay valve combination 12 comprises back pressure valves 13 and 14. Delay valve combination 12 is connected to a pilot control valve combination indicated generally by the numeral 15. Combination 15 comprises pneumatically operated two-way spring return valves 16 and 17 which are controlled by solenoid operated pilot valve 18. Valve 18 is provided with signal generator 19 which functions to indicate that valve 18 has been actuated. Valve combination 15 is connected to pressure regulator 20 and filter 21. Filter 21 is connected to a plurality of explosive valves 22, 23, 24 and 25. Valves 22 and 24 are "start" valves and are normally closed. Valves 23 and 25 are "stop" valves and are normally open. These valves are connected to nitrogen pressure sources 26. Valve 27 which permits filling of pressure sources 26 is also provided.

Valve 17 connects with propellant tank 28 which encloses bladder 29 which contains the propellant. Bladder 29 also connects with porpellant fill valve 30, while propellant tank 28 connects with pressurization valve 31.

In operation, the system of the present invention may be controlled by a central computor and sequencer or comparable sequence timer which causes a command signal to be transmitted to the system. In order to accomplish a mid-course maneuver, the central computor and sequencer receives the time, direction and magnitude of the mid-course firing through the ground communication link. After the spacecraft has assumed the correct firing attitude, the mid-course propulsion system is initiated by an electrical signal from the central computor and sequencer. This signal causes one of the normally closed explosive valves 22 or 24 to be opened and activates solenoid pilot valve 18 whereby valve 18 is opened. Opening of valves 22 and 18 permits pressurizing fluid, e.g., nitrogen, to flow from pressure source 26 whereby control valve combination 15 is activated to the open position. This activation results from the pneumatic connection of valves 16 and 17 to valve 18. This arrangement greatly simplifies the pneumatic circuitry of the present invention since it enables control of valves 16 and 17 by the single solenoid attached to valve 18 rather than by separate solenoids. Opening of valves 16 and 17 allows pressurization of propellant tank 28 and delay valve combination 12. Valve 14 in combination 12 is a back pressure spring return valve which requires that a predetermined amount of pressure be exerted thereon before the valve is activated. This predetermined pressure is set at or slightly less than the operating pressure of propellant tank 28. Thus, if the pressure in propellant tank 28 has decayed appreciably, valve 14 causes tank 28 to be brought to near-operating pressure before valve 14 opens. When tank 28 is brought to operating pressure, bladder 29 is compressed and propellant, e.g., hydrazine, is expelled from the bladder. In addition, opening of valve 14 causes ratchet subassembly 8 to be pressurized. Pressurization of ratchet subassembly 8 causes a small quantity of oxidizer to be expelled from reservoir 7, through back pressure valve 11, conduit 4 and into rocket engine 1. Propellant is likewise caused to flow through valve 6 which is opened by the pressurization of subassembly 8, conduit 3 and into rocket engine 1. The opening of valve 6 is indicated by microswitch 9.

When the propellant and oxidizer come into contact in rocket engine 1, hypergolic ignition is initiated, followed by continuous catalytic monopropellant decomposition of the propellant. The rocket engine will then continue to operate until a signal causing it to terminate is transmitted.

Upon a command signal from the central computor and sequencer to terminate engine thrust, normally open explosive valve 23 and solenoid pilot valve 18 are activated to a closed position thereby causing positive isolation of the remaining nitrogen in pressure source 26. Spring loaded valves 16 and 17 are adapted to vent the nitrogen pressure downstream from each of them. Spring loaded valve 14 closes when pressure is released, but the pressurizing fluid is easily vented since it flows through valve 13 which is a back pressure spring return valve having only a nominal back pressure, e.g., 2 p.s.i. Back pressure valve 14 has a substantial back pressure, e.g., 280 p.s.i., as does valve 11, e.g., 320 p.s.i. When control valves 16 and 17 are closed, pressurization of propellant tank 28 is terminated, but this pressurization is not vented. Termination of pressurization of propellant tank 28 and venting of the system thereby causes spring loaded valve 6 to close because of the unopposed force exerted by the spring which in turn terminates propellant flow and thrust. The closing of valve 6 is indicated by microswitch 9.

These operations may be repeated as many times as desired, depending upon the design of the system. For each thrust initiation, a slug of oxidizer must be delivered to the rocket engine. Thus, the ratchet subassembly 8 should be designed such that it is capable of delivering the necessary number of slugs of oxidizer. For many spacecraft flights, about five to eight slugs are sufficient. If there are to be long delays between series of firings, e.g., when a first series of firings is to be made shortly after launch and a second series of firings is to be made at a relatively later time shortly before arrival at destination, it is desirable to provide a sufficient number of pairs of explosive valves such that the pressure source may be effectively isolated during those lengthy periods when firing is not desired. Thus, when two series of firings are contemplated, two series of explosive valves such as those shown in FIGURE 1 are provided. In each series of firings, the first firing is initiated by opening a normally closed explosive valve and the last firing is terminated by closing its associated normally open valve. The intermediate firings are terminated simply by activating pilot valve 18 to a closed position.

For example, in a typical Mars trajectory, it would be desirable to execute a mid-course maneuver approximately four days after launch. The central computor and sequencer first receives the time, direction and magnitude of mid-course firing through the ground-to-spacecraft communication link. The required velocity vector is computed from trajectory data accrued by ground tracking during the four days following launch and represents the velocity vector needed to place the spacecraft on the desired trajectory. After the spacecraft has assumed the correct firing attitude, the midcourse propulsion system of the present invention is ignited through an electrical signal from the central computor and sequencer. Thrust termination and reinitiation are controlled by electrical signals from the central computor and sequencer until the specified velocity increment has been realized as computed by the spacecraft integrating accelerometer. During the rocket engine firing, spacecraft attitude is maintained by auto-pilot-controlled jet vane actuators. The series of firings is then terminated by an electrical signal which actuates both the solenoid pilot valve and a normally open explosive valve. The spacecraft is then permitted to follow its course until it approaches its destination, about 230 days after launch being required for a typical Mars trajectory. When the spacecraft approaches the target planet, an onboard computor calculates the spacecraft velocity vector relative to the planet (based on position fixes obtained for measuring the apparent diameter of the target plane and the angles between the planet and two stars), the required velocity vector, and the time of application needed to place the spacecraft on the desired trajectory. The spacecraft again maneuvers to the desired attitude and upon a signal from the central computor and sequencer, the engine is ignited. Once again, a series of firing may be executed by transmitting electrical signals which actuate the solenoid pilot valve until the proper velocity increment has been realized as computed by the spacecraft integrating accelerometer. Then, this series is again terminated by actuating both a normally open explosive valve and the solenoid pilot valve. Typically, corrections could be made between 1,500,000 and 400,000 km. from the target planet, i.e., two approach corrections, in which case the firings would be separated by, roughly, three days.

A typical rocket engine which could be controlled by the system of the present invention could employ anhydrous hydrazine as a liquid monopropellant and $N_2O_4$ as an oxidizer. This engine could nominally develop a vacuum thrust of 50 pounds and a vacuum specific impulse of 235 pound-second/pound. The nominal pressure of the nitrogen reservoir at first ignition could be 3,000 p.s.i.a., the operating pressure of the propellant tank 320 p.s.i.a. and the operating pressure of the thrust chamber 200 p.s.i.a. The nominal temperature of the nitrogen reservoir at first ignition could be 70° F., the operating temperature of the propellant tank 70° F., and the operating temperature of the thrust chamber 1800–1900° F. The slugs of oxidizer delivered by the ratchet subassembly could be 13 cc.

In the embodiment illustrated in FIGURE 2, those elements which are the same as those illustrated in FIGURE 1 have been indicated by corresponding numerals. The embodiment illustrated in FIGURE 2 differs from that shown in FIGURE 1 primarily in that the explosive valves 22–25 and valve combination 15 of FIGURE 1 have been eliminated. In addition, the embodiment illustrated in FIGURE 2 is provided with a check valve 32 which is positioned between pilot valve 18 and propellant tank 28.

In this embodiment, the system is operated only by transmitting signals to pilot valve 18. To initiate firing, pilot valve 18 is actuated to an open position whereby nitrogen or other pressurized fluid from pressure source 26 is allowed to pass through check valve 32 and into propellant tank 28 whereby bladder 29 is subjected to pressure. As previously described, delay valve combination 12 insures that propellant tank 28 is brought to near operating pressure before the propellant and oxidizer are injected into engine 1. Likewise, firing is terminated by actuating valve 18 to the closed position whereby the pressurizing fluid is isolated in pressure source 26. Upon closing of valve 18, pressure in the propellant tank is effectively isolated by check valve 32.

It will be readily apparent to those skilled in the art that the present invention may be modified without departing from the scope thereof. For example, solenoid valves may be used in place of the explosive and pneumatically operated valves shown in the embodiment in FIGURE 1. However, the use of such valves tends to complicate the system without compensating advantages. Furthermore, propellant valve 6 could be operated independently of subassembly 8 and control valves 16 and 17 could be operated independently of pilot valve 18. However, the specific embodiments illustrated in FIGURES 1 and 2 are believed to possess unexpected advantages which are themselves inventive improvements on the generic concept of the present invention.

Having fully described the present invention, it is to be understood that it is not to be limited to the specific details set forth, but is of the full scope of the appended claims.

We claim:

1. A trajectory correction propulsion system comprising a propellant source, pressure source means for expelling propellant from said propellant source, pilot valve means for releasing the pressure from said pressure source, a ratchet oxidizer start slug subassembly, a first conduit connected between said propellant source and a rocket engine, and a second conduit connected between said ratchet subassembly and said rocket engine, said pilot valve means including means for actuating said ratchet subassembly.

2. A trajectory correction propulsion system comprising a propellant source, pressure source means for expelling propellant from said propellant source, pilot valve means for releasing the pressure from said pressure source, a ratchet oxidizer start slug subassembly, said pilot valve means including means for actuating said ratchet subassembly, delay valve means for causing said propellant source to approach operating pressure before said ratchet subassembly is actuated, a first conduit connected between said propellant source and a rocket engine, and a second conduit connected between said ratchet subassembly and said rocket engine.

3. A trajectory correction propulsion system comprising a propellant source, pressure source means for expelling propellant from said propellant source, first control valve means for permitting the pressure from said pressure source to be transmitted to said propellant source, a ratchet oxidizer start slug subassembly, second control valve means for permitting the pressure from said pressure source to be transmitted to said ratchet subassembly, pilot valve means for actuating said first control valve means and said second control valve whereby actuation of said pilot valve means may cause pressurization of said propellant source and actuation of said ratchet subassembly, a first conduit connected between said propellant source and a rocket engine, and a second conduit connected between said ratchet subassembly and said rocket engine.

4. The propulsion system of claim 3 wherein a delay valve is provided between said second control valve means and said ratchet subassembly whereby, after actuation of said pilot valve means, said propellant source may be pressurized to an extent approaching operating pressure before said ratchet subassembly is actuated.

5. The propulsion system of claim 4 wherein said pressure source is provided with at least one pair of explosive valves, said pair of explosive valves comprising a normally open valve and a normally closed valve.

6. The propulsion system of claim 5 wherein said first conduit is provided with a propellant valve, said propellant valve being connected to said ratchet subassembly such that said propellant valve is opened when said ratchet subassembly is activated and closed when said ratchet subassembly is deactivated.

7. The propulsion system of claim 1 wherein said system is provided with a check valve positioned between said pilot valve and said propellant source, said check valve being adapted to permit pressurizing fluid to flow in the direction of said propellant source and being adapted to prevent pressurizing fluid from flowing away from said propellant source.

8. The propulsion system of claim 2 wherein said system is provided with a check valve positioned between said pilot valve and said propellant source, said check valve being adapted to permit pressurizing fluid to flow in the direction of said propellant source and being adapted to prevent pressurizing fluid from flowing away from said propellant source.

9. A trajectory correction propulsion system comprising a propellant source, pressure source means for expelling propellant from said propellant source, pilot valve means for releasing the pressure from said pressure source, a ratchet oxidizer start slug subassembly, a first conduit connected between said propellant source and a rocket engine, a second conduit connected between said ratchet subassembly and said rocket engine, and a propellant valve positioned in said first conduit, said propellant valve being connected to said ratchet subassembly such that said propellant valve is opened when said ratchet subassembly is activated and closed when said ratchet subassembly is deactivated, said pilot valve means including means for activating and deactivating said ratchet subassembly.

References Cited by the Examiner
UNITED STATES PATENTS

| | | | |
|---|---|---|---|
| 3,098,353 | 7/1963 | Abild | 60—39.14 X |
| 3,120,738 | 2/1964 | Webb | 60—35.6 |
| 3,128,601 | 4/1964 | Abild | 60—39.14 X |

MARK NEWMAN, *Primary Examiner.*